(12) United States Patent
Drews et al.

(10) Patent No.: US 11,365,497 B2
(45) Date of Patent: Jun. 21, 2022

(54) SYSTEM AND PROCESS FOR PREPARING POLYLACTIC ACID NONWOVEN FABRICS

(71) Applicants: Fitesa Germany GmbH, Peine (DE); Fitesa Simpsonville, Inc., Simpsonville, SC (US)

(72) Inventors: Gary Drews, Greenville, SC (US); Elena Novarino, Hannover (DE); Jason Hamilton, Peine (DE); Alfredo Izzo, Peine (DE); David Dudley Newkirk, Greer, SC (US)

(73) Assignees: Fitesa Germany GmbH, Peine (DE); Fitesa Simpsonville, Inc., Simpsonville, SC (US)

( * ) Notice: Subject to any disclaimer, the term of this patent is extended or adjusted under 35 U.S.C. 154(b) by 106 days.

(21) Appl. No.: 16/778,970

(22) Filed: Jan. 31, 2020

(65) Prior Publication Data
US 2020/0165761 A1    May 28, 2020

Related U.S. Application Data

(62) Division of application No. 15/666,675, filed on Aug. 2, 2017, now Pat. No. 10,590,577.
(Continued)

(51) Int. Cl.
| | |
|---|---|
| *D04H 3/16* | (2006.01) |
| *D04H 3/011* | (2012.01) |
| *D01F 8/14* | (2006.01) |
| *D01D 5/32* | (2006.01) |
| *D01D 5/098* | (2006.01) |

(Continued)

(52) U.S. Cl.
CPC .............. *D04H 3/16* (2013.01); *B29C 43/003* (2013.01); *B29C 43/24* (2013.01); *B29C 71/04* (2013.01); *D01D 5/08* (2013.01); *D01D 5/098* (2013.01); *D01D 5/32* (2013.01); *D01D 5/34* (2013.01); *D01F 6/625* (2013.01); *D01F 6/92* (2013.01); *D01F 8/14* (2013.01); *D04H 3/009* (2013.01); *D04H 3/011* (2013.01); *D04H 3/14* (2013.01); *D04H 3/147* (2013.01); *D06M 14/32* (2013.01); *B29K 2067/046* (2013.01);
(Continued)

(58) Field of Classification Search
None
See application file for complete search history.

(56) References Cited

U.S. PATENT DOCUMENTS

| | | | | |
|---|---|---|---|---|
| 3,634,726 A | * | 1/1972 | Jay | ......................... H01T 19/00 361/220 |
| 3,790,854 A | * | 2/1974 | Dryczynski et al. | ..... H05F 3/04 361/213 |

(Continued)

*Primary Examiner* — Jeffry H Aftergut
(74) *Attorney, Agent, or Firm* — Rimon, P.C.

(57) ABSTRACT

A system for preparing a polylactic acid (PLA) spunbond nonwoven fabric is provided. In particular, the system includes a first PLA source configured to provide a stream of molten or semi-molten PLA resin; a spin beam in fluid communication with the first PLA source, the spin beam configured to extrude and draw a plurality of PLA continuous filaments; a collection surface disposed below an outlet of the spin beam onto which the PLA continuous filaments are deposited to form the PLA spunbond nonwoven fabric; a first ionization source positioned and arranged to expose the PLA continuous filaments to ions; and a calender positioned downstream of the first ionization source.

26 Claims, 7 Drawing Sheets

Related U.S. Application Data

(60) Provisional application No. 62/370,087, filed on Aug. 2, 2016.

(51) Int. Cl.

| | |
|---|---|
| *D01F 6/62* | (2006.01) |
| *D01D 5/34* | (2006.01) |
| *D04H 3/14* | (2012.01) |
| *B29C 43/00* | (2006.01) |
| *B29C 43/24* | (2006.01) |
| *B29C 71/04* | (2006.01) |
| *D01D 5/08* | (2006.01) |
| *D01F 6/92* | (2006.01) |
| *D04H 3/009* | (2012.01) |
| *D04H 3/147* | (2012.01) |
| *D06M 14/32* | (2006.01) |
| *D01D 10/00* | (2006.01) |
| *B29K 67/00* | (2006.01) |
| *B29K 105/08* | (2006.01) |
| *B29L 31/00* | (2006.01) |

(52) U.S. Cl.
CPC ..... *B29K 2105/08* (2013.01); *B29L 2031/726* (2013.01); *D01D 5/0985* (2013.01); *D01D 10/00* (2013.01)

(56) References Cited

U.S. PATENT DOCUMENTS

| | | | | |
|---|---|---|---|---|
| 3,855,046 | A | * 12/1974 | Hansen | D04H 3/14 428/198 |
| RE31,382 | E | * 9/1983 | Moore | H05F 3/04 361/213 |
| 6,506,873 | B1 | * 1/2003 | Ryan | D01F 8/14 528/354 |
| 7,488,441 | B2 | * 2/2009 | Haynes | B29C 71/0081 264/103 |
| 2005/0087288 | A1 | * 4/2005 | Haynes | D04H 3/02 156/167 |
| 2012/0040582 | A1 | * 2/2012 | Topolkaraev | C08L 67/04 442/334 |

* cited by examiner

60c

60d

SYSTEM AND PROCESS FOR PREPARING POLYLACTIC ACID NONWOVEN FABRICS

CROSS-REFERENCE TO RELATED APPLICATION

This application is a divisional application of U.S. patent application Ser. No. 15/666,675 filed Aug. 2, 2017, which claims the benefit of priority to U.S. Application No. 62/370,087 filed on Aug. 2, 2016, the contents of which are both incorporated herein by reference in their entirety for all purposes.

FIELD

The presently-disclosed invention relates generally to systems and processes for preparing nonwoven fabrics, and more particularly to systems and processes for preparing polylactic acid (PLA) spunbond nonwoven fabrics.

BACKGROUND

Nonwoven fabrics are used in a variety of applications such as garments, disposable medical products, diapers, personal hygiene products, among others. New products being developed for these applications have demanding performance requirements, including comfort, conformability to the body, freedom of body movement, good softness and drape, adequate tensile strength and durability, and resistance to surface abrasion, pilling or fuzzing. Accordingly, the nonwoven fabrics which are used in these types of products must be engineered to meet these performance requirements.

Traditionally, such nonwoven fabrics are prepared from thermoplastic polymers, such as polyester, polystyrene, polyethylene, and polypropylene. These polymers are generally very stable and can remain in the environment for a long time. Recently, however, there has been a trend to develop articles and products that are considered environmentally friendly and sustainable. As part of this trend, there has been a desire to produce ecologically friendly products comprised of increased sustainable content in order to reduce the content of petroleum based materials.

Polylactic acid or polylactide-based polymers (PLA) provide a cost-effective path to sustainable content spunbond nonwovens that can be readily converted into consumer products. To fully capture the cost-effective benefits of PLA-based consumer products, PLA must be convertible into nonwovens and then into the final consumer product at very high speeds with minimal waste. However, it is difficult to combine the steps of spinning, web formation, and bonding at the very high speeds needed for the economically attractive production of spunbond PLA with desired fabric properties.

To address this need, nonwovens have been developed having a sheath/core bicomponent structure in which the PLA is present in the core, and a synthetic polymer, such as polypropylene, is in the sheath. Such nonwovens are described in U.S. Pat. No. 6,506,873. The presence of the synthetic polymer in the sheath provides the necessary properties for commercial production of nonwovens comprising PLA at high speeds.

Accordingly, there still exists a need for systems and processes for static protection during the processing of PLA.

BRIEF SUMMARY

One or more embodiments of the invention may address one or more of the aforementioned problems. Certain embodiments according to the invention provide systems and processes for preparing polylactic acid (PLA) spunbond nonwoven fabrics at high speeds. In particular, embodiments of the invention are directed to systems and processes that utilize means for controlling static, including ionization bars, to prepare PLA spunbond nonwoven fabric. In this regard, PLA processing can occur at high speeds with minimal waste, thereby making spunbond PLA production economically attractive.

In accordance with certain embodiments, the system includes a first PLA source configured to provide a stream of molten or semi-molten PLA resin, a spin beam in fluid communication with the first PLA source, a collection surface disposed below an outlet of the spin beam onto which the PLA continuous filaments are deposited to form the PLA spunbond nonwoven fabric, a first ionization source positioned and arranged to expose the PLA continuous filaments to ions, and a calender positioned downstream of the first ionization source. The spin beam, according to certain embodiments, is configured to extrude and draw a plurality of PLA continuous filaments.

In another aspect, certain embodiments according to the invention provide a process for preparing a polylactic acid (PLA) spunbond nonwoven fabric. In accordance with certain embodiments, the process includes providing a stream of molten or semi-molten PLA resin, forming a plurality of drawn PLA continuous filaments, depositing the plurality of PLA continuous filaments onto a collection surface, exposing the plurality of PLA continuous filaments to ions, and bonding the plurality of PLA continuous filaments to form the PLA spunbond nonwoven fabric.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
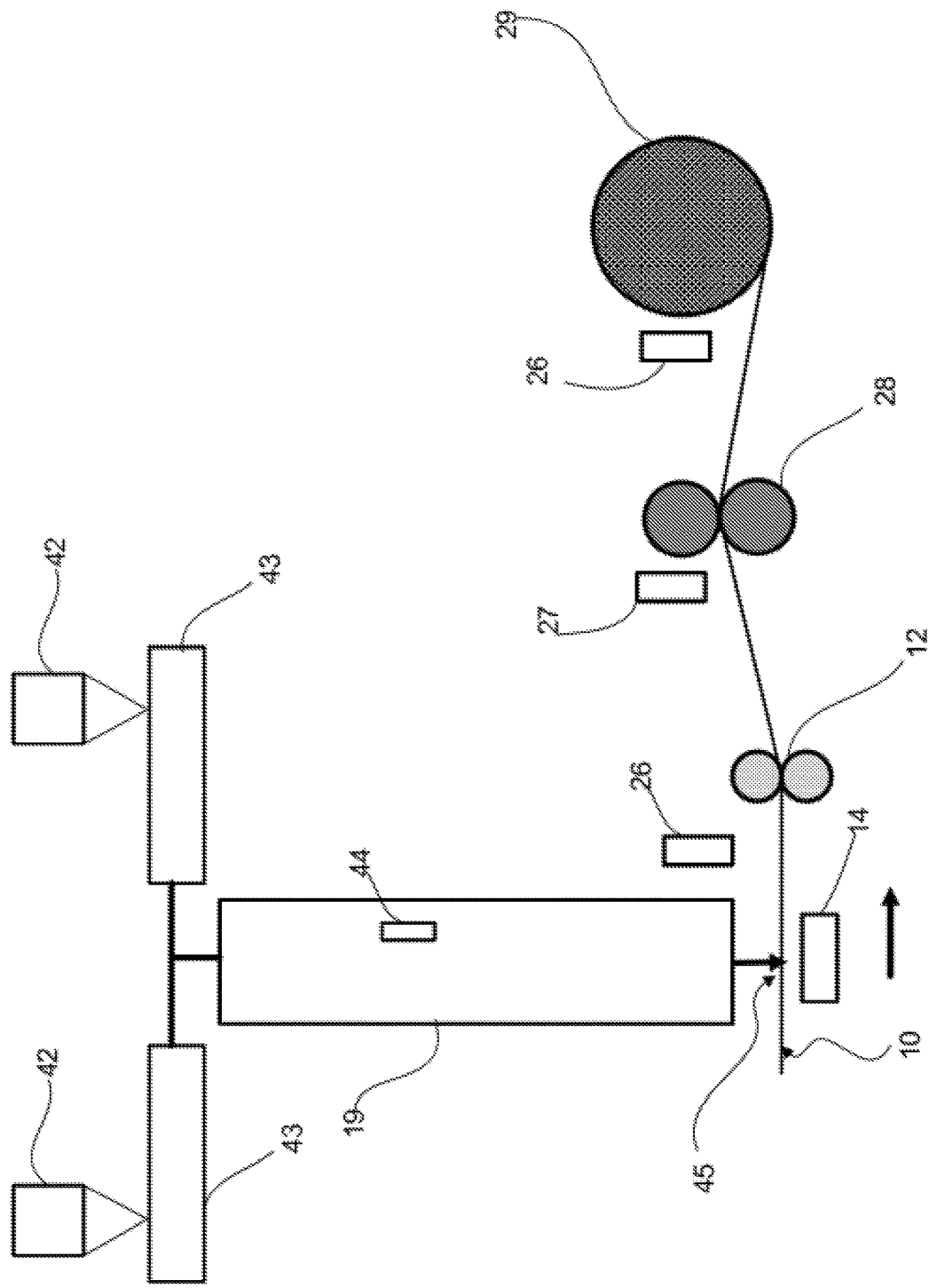
FIG. 1 is a schematic diagram of the PLA spunbond nonwoven fabric preparation system in accordance with certain embodiments of the invention.

The invention now will be described more fully hereinafter with reference to the accompanying drawings, in which some, but not all embodiments of the inventions are shown. Indeed, this invention may be embodied in many different forms and should not be construed as limited to the embodiments set forth herein; rather, these embodiments are provided so that this disclosure will satisfy applicable legal requirements. Like numbers refer to like elements throughout. As used in the specification, and in the appended claims, the singular forms "a", "an", "the", include plural referents unless the context clearly dictates otherwise.

The invention includes, according to certain embodiments, systems and processes for preparing polylactic acid (PLA) spunbond nonwoven fabrics at high speeds. In particular, embodiments of the invention are directed to systems and processes that utilize means for controlling static, including ionization sources, to prepare PLA spunbond nonwoven fabric. In this regard, PLA processing can occur at high speeds with minimal waste, thereby making spunbond PLA production economically attractive.

PLA spunbond nonwoven fabrics made by systems and processes in accordance with embodiments of the invention may be used in a wide variety of applications, including diapers, feminine care products, incontinence products, agricultural products (e.g., root wraps, seed bags, crop covers and/or the like), industrial products (e.g. work wear coveralls, airline pillows, automobile trunk liner and sound proofing), and household products (e.g., furniture scratch pads, mattress coil covers and/or the like).

I. Definitions

For the purposes of the present application, the following terms shall have the following meanings:

The term "fiber" can refer to a fiber of finite length or a filament of infinite length.

As used herein, the term "monocomponent" refers to fibers formed from one polymer or formed from a single blend of polymers. Of course, this does not exclude fibers to which additives have been added for color, anti-static properties, lubrication, hydrophilicity, liquid repellency, etc.

As used herein, the term "multicomponent" refers to fibers formed from at least two polymers (e.g., bicomponent fibers) that are extruded from separate extruders. The at least two polymers can each independently be the same or different from each other, or be a blend of polymers. The polymers are arranged in substantially constantly positioned distinct zones across the cross-section of the fibers. The components may be arranged in any desired configuration, such as sheath-core, side-by-side, pie, island-in-the-sea, and so forth. Various methods for forming multicomponent fibers are described in U.S. Pat. No. 4,789,592 to Taniguchi et al. and U.S. Pat. No. 5,336,552 to Strack et al., U.S. Pat. No. 5,108,820 to Kaneko, et al., U.S. Pat. No. 4,795,668 to Kruege, et al., U.S. Pat. No. 5,382,400 to Pike, et al., U.S. Pat. No. 5,336,552 to Strack, et al., and U.S. Pat. No. 6,200,669 to Marmon, et al., which are incorporated herein in their entirety by reference. Multicomponent fibers having various irregular shapes may also be formed, such as described in U.S. Pat. No. 5,277,976 to Hogle, et al., U.S. Pat. No. 5,162,074 to Hills, U.S. Pat. No. 5,466,410 to Hills, U.S. Pat. No. 5,069,970 to Largman, et al., and U.S. Pat. No. 5,057,368 to Largman, et al., which are incorporated herein in their entirety by reference.

As used herein, the terms "nonwoven," "nonwoven web" and "nonwoven fabric" refer to a structure or a web of material which has been formed without use of weaving or knitting processes to produce a structure of individual fibers or threads which are intermeshed, but not in an identifiable, repeating manner. Nonwoven webs have been, in the past, formed by a variety of conventional processes such as, for example, meltblown processes, spunbond processes, and staple fiber carding processes.

As used herein, the term "meltblown" refers to a process in which fibers are formed by extruding a molten thermoplastic material through a plurality of fine, usually circular, die capillaries into a high velocity gas (e.g. air) stream which attenuates the molten thermoplastic material and forms fibers, which can be to microfiber diameter. Thereafter, the meltblown fibers are carried by the gas stream and are deposited on a collecting surface to form a web of random meltblown fibers. Such a process is disclosed, for example, in U.S. Pat. No. 3,849,241 to Buntin et al.

As used herein, the term "machine direction" or "MD" refers to the direction of travel of the nonwoven web during manufacturing.

As used herein, the term "cross direction" or "CD" refers to a direction that is perpendicular to the machine direction and extends laterally across the width of the nonwoven web.

As used herein, the term "spunbond" refers to a process involving extruding a molten thermoplastic material as filaments from a plurality of fine, usually circular, capillaries of a spinneret, with the filaments then being attenuated and drawn mechanically or pneumatically. The filaments are deposited on a collecting surface to form a web of randomly arranged substantially continuous filaments which can thereafter be bonded together to form a coherent nonwoven fabric. The production of spunbond non-woven webs is illustrated in patents such as, for example, U.S. Pat. Nos. 3,338,992; 3,692,613, 3,802,817; 4,405,297 and 5,665,300. In general, these spunbond processes include extruding the filaments from a spinneret, quenching the filaments with a flow of air to hasten the solidification of the molten filaments, attenuating the filaments by applying a draw tension, either by pneumatically entraining the filaments in an air stream or mechanically by wrapping them around mechanical draw rolls, depositing the drawn filaments onto a foraminous collection surface to form a web, and bonding the web of loose filaments into a nonwoven fabric. The bonding can be any thermal or chemical bonding treatment, with thermal point bonding being typical.

As used herein, the term "thermal point bonding" involves passing a material such as one or more webs of fibers to be bonded between a heated calender roll and an anvil roll. The calender roll is typically patterned so that the fabric is bonded in discrete point bond sites rather than being bonded across its entire surface.

As used herein, the term "polymer" generally includes, but is not limited to, homopolymers, copolymers, such as, for example, block, graft, random and alternating copolymers, terpolymers, etc. and blends and modifications thereof. Furthermore, unless otherwise specifically limited, the term "polymer" shall include all possible geometrical configurations of the material, including isotactic, syndiotactic and random symmetries.

II. System for Preparing PLA Spunbond Nonwoven Fabrics

Certain embodiments according to the invention provide systems for preparing a polylactic acid (PLA) spunbond nonwoven fabric. In accordance with certain embodiments, the system includes a first PLA source configured to provide a stream of molten or semi-molten PLA resin, a spin beam in fluid communication with the first PLA source, a collection surface disposed below an outlet of the spin beam onto which the PLA continuous filaments are deposited to form the PLA spunbond nonwoven fabric, a first ionization source positioned and arranged to expose the PLA continuous filaments to ions, and a calender positioned downstream of the first ionization source. The spin beam, according to certain embodiments, is configured to extrude and draw a plurality of PLA continuous filaments.

In this regard, the spunbond nonwoven web may be produced, for example, by the conventional spunbond process on spunbond machinery such as, for example, the Reicofil-3 line or Reicofil-4 line from Reifenhauser, as described in U.S. Pat. No. 5,814,349 to Geus et al, the entire contents of which are incorporated herein by reference, wherein molten polymer is extruded into continuous filaments which are subsequently quenched, attenuated pneumatically by a high velocity fluid, and collected in random arrangement on a collecting surface. In some embodiments, the continuous filaments are collected with the aid of a vacuum source positioned below the collection surface. After filament collection, any thermal, chemical or mechanical bonding treatment may be used to form a bonded web such that a coherent web structure results. As one skilled in the art will understand, examples of thermal bonding may include thru-air bonding where hot air is forced through the web to soften the polymer on the outside of certain fibers in the web followed by at least limited compression of the web or calender bonding where the web is compressed between two rolls, at least one of which is heated, and typically one is an embossed roll.

In some embodiments, for instance, the collection surface may comprise conductive fibers. The conductive fibers may comprise monofilament wires made from polyethersulfone conditioned with polyamide (e.g., Huycon—LX 135). In the machine direction, the fibers comprise polyamide conditioned polyethersulfone. In the cross-machine direction, the fibers comprise polyamide conditioned polyethersulfone in combination with additional polyethersulfone.

With reference to FIG. 1, for example, a schematic diagram of the PLA spunbond nonwoven fabric preparation system in accordance with certain embodiments of the invention is illustrated. As shown in FIG. 1, the PLA source (i.e. hopper) 42 is in fluid communication with the spin beam 19 via the extruder 43. Although FIG. 1 illustrates an embodiment having two PLA sources 42 and two extruders 43, the system may include any number of polymer sources (e.g., PLA, synthetic polymer, such as polypropylene, polyethylene, etc.) and extruders as dictated by a particular application as understood by one of ordinary skill in the art. Following extrusion, the extruded polymer may then enter a plurality of spinnerets (not shown) for spinning into filaments. Following spinning, the spun filaments may then be drawn (i.e. attenuated) via a drawing unit (not shown) and randomized in a diffuser (46 in FIGS. 2A-2C). The spin beam 19 produces a curtain of filaments (47 in FIGS. 2A-2C) that is deposited on the collection surface 10 at point 45.

In one embodiment, the thus deposited filaments may then be bonded to form a coherent web. In some embodiments, a pair of cooperating rolls 12 (also referred to herein as a "press roll") stabilize the web of the PLA continuous filaments by compressing said web before delivery to the calender 28 for bonding. In some embodiments, for example, the press roll may include a ceramic coating deposited on a surface thereof. In certain embodiments, for instance, one roll of the pair of cooperating rolls 12 may be positioned above the collection surface 10, and a second roll of the pair of cooperating rolls 12 may be positioned below the collection surface 10. Finally, the bonded PLA spunbond nonwoven fabric moves to a winder 29, where the fabric is wound onto rolls.

During the course of their investigation, the inventors have discovered that static generation during fiber spinning and web processing when PLA is exposed on the fiber surface promotes web wraps at the press rolls and calender of the spunbond machine. This web wrap is undesirable and generally has prevented the high speed production of fabrics comprising 100% PLA, or fabrics in which PLA is exposed at the surface of the fibers. One method of addressing web wrap is by increasing the humidity of the spunbond process by, for example, injecting steam into the air stream used to quench the just-spun fibers or providing a fine mist or fog of moisture around the press rolls where the spun fibers are first formed into an unbonded web. Although the extra humidity provides some protection from web wraps, the addition of high moisture over a period of time may promote corrosion of the spunbond machine and growth of mold or microorganisms detrimental to nonwoven use in hygiene and medical operations.

Another method of reducing static charge build up in the nonwoven fabric is to contact the web where the PLA is exposed on the surface of the fiber with a conductive static bar, which helps to ground the web, thereby dissipating charge build-up. However, this approach requires direct contact between the nonwoven web and the conductive substrate, and at such contact points there remains the possibility of direct discharge of static electricity through space with resulting possible harm to the operator, damage to equipment and risk of fire.

Advantageously, the inventors have discovered that fabrics comprising 100% PLA may be prepared at commercially viable processing speeds by positioning one or more ionization sources in close proximity to the nonwoven fabric. For example, in one embodiment, an ionization source 26 may be positioned near the spin beam 19 and the winder 29 to actively dissipate/neutralize static charge without contacting the fabric. As explained below, the ionization source exposes the nonwoven fabric to a stream of ions, which act to neutralize static charges in the nonwoven fabric. The stream of ions may include positive ions, negative ions, and combinations thereof.

In some embodiments, it may also be desirable to position a static control unit 27 near the calender 28. The static control unit 27 may be a passive static bar requiring contact with the fabric or an active ionization bar, which does not require contact with the fabric. Finally, an optional humidity unit 44 may be used in conjunction with the spin beam 19 and/or the press roll 12 to reduce static via added moisture.

In accordance with certain embodiments, for example, the first ionization source may be positioned above the collection surface and downstream of a point at where the PLA continuous filaments are deposited on the collection surface. However, in other embodiments, for instance, the first ionization source may be positioned between the outlet of the spin beam and the collection surface.

As discussed previously, the system may further comprise a press roll positioned downstream from the outlet of the spin beam. In this regard, the press roll may be configured to stabilize the web of the PLA continuous filaments by compressing said web before delivery of the PLA continuous fibers from the outlet of the spin beam towards the calender. In those embodiments including the press roll, for example, the first ionization source may be positioned downstream from the press roll. In other embodiments, for instance, the first ionization source may be positioned between the spin beam and the press roll.

In some embodiments and as shown in FIG. 1, the system may comprise a vacuum source 14 disposed below the collection surface for pulling the plurality of PLA continuous filaments from the outlet of the spin beam onto the collection surface before delivery to the calender.

Figure 2C:
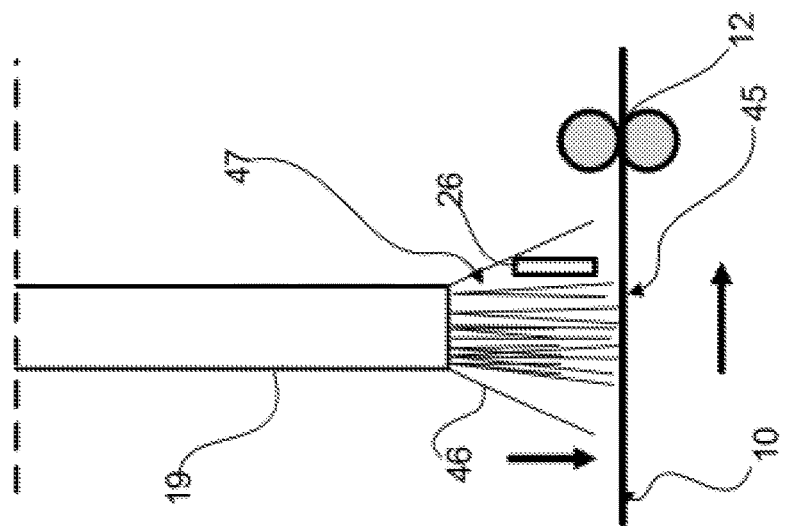
FIGS. 2A-2C are schematic diagrams illustrating positioning of the first ionization source in accordance with certain embodiments of the invention.
Figure 2B:
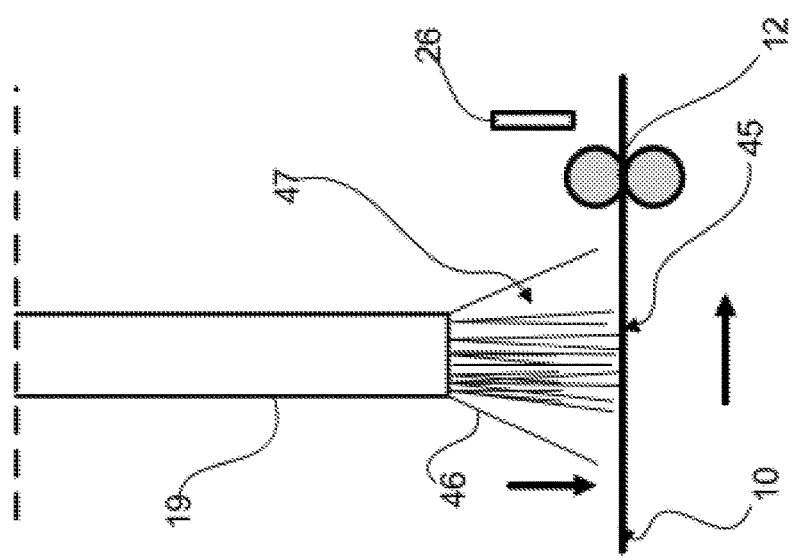
Figure 2A:
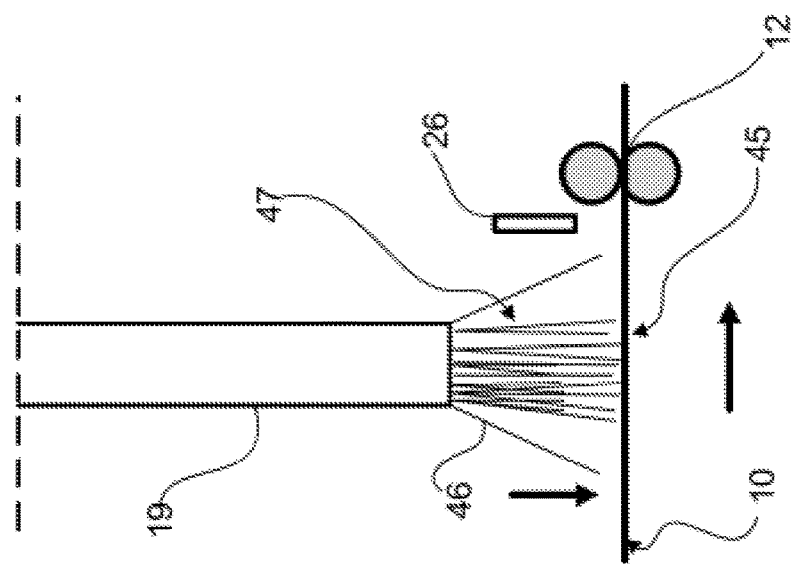

FIGS. 2A-2C, for example, are schematic diagrams illustrating positioning of the first ionization source in accordance with certain embodiments of the invention. As shown in FIG. 2A, the first ionization source 26 is positioned downstream of the outlet (i.e. diffuser) 46 of the spin beam 19 but upstream of the press roll 12. In FIG. 2B, however, the first ionization source 26 is positioned downstream of the press roll 12. In FIG. 2C, the first ionization source is positioned downstream of the point 45 at which the curtain of filaments 47 are deposited on the collection surface but also within the outlet 46.

Preferably, the ionization source comprises a device that is capable of actively discharging ions with the use of electrodes, ionizing air nozzles, ionizing air blowers, and the like. In one embodiment, the ionization source comprises an active discharge ionization bar that actively discharges ions in the direction of the nonwoven fabric. Examples of suitable ionization bars may include Elektrostatik Discharging Electrode E3412, which is available from Iontis.

In one embodiment, the ionization bar may extend over the web in the cross direction. Preferably, the ionization bar extends in the cross direction across the total width of the nonwoven fabric. In further embodiments, the ionization bar may extend under the web and the collection surface in the cross direction. However, positioning the ionization bar under the collection surface may be less effective than positioning the ionization bar over the web in the cross direction.

According to certain embodiments, for example, the first ionization source and the collection surface may be separated by a distance from about 1 inch to about 24 inches. In other embodiments, for instance, the first ionization source and the collection surface may be separated by a distance from about 1 inch to about 12 inches. In further embodiments, for example, the first ionization source and the collection surface may be separated by a distance from about 1 inch to about 5 inches. As such, in certain embodiments, the first ionization source and the collection surface may be separated by a distance from at least about any of the following: 1, 1.25, 1.5, 1.75, and 2 inches and/or at most about 24, 20, 16, 12, 10, 9, 8, 7, 6, and 5 inches (e.g., about 1.5-10 inches, about 2-8 inches, etc.).

In accordance with certain embodiments, for instance, the system may further comprise a static control unit positioned and arranged to dissipate static from the PLA spunbond nonwoven fabric proximate to the calender. In some embodiments, for example, the static control unit may be positioned upstream from, and adjacent to, the calender. In other embodiments, however, the static control unit may be positioned downstream from, and adjacent to, the calender.

In some embodiments, for instance, the static control unit may comprise a passive static bar. In such embodiments, the static control unit may contact the PLA spunbond nonwoven fabric in order to dissipate static charge. In other embodiments, however, the static control unit may comprise a second ionization source. As such, the second ionization source may actively dissipate static charge from the PLA spunbond nonwoven fabric such that contact by the second ionization source with the PLA spunbond nonwoven fabric is not required in order to dissipate the static charge.

According to certain embodiments, for example, the system may further comprise a winder positioned downstream from the calender. In such embodiments, for instance, the system may also include a third ionization source positioned and arranged to expose the PLA spunbond nonwoven fabric to ions proximate to the winder. In some embodiments, for example, at least one of the first ionization source, the static control source (e.g., the second ionization source), and the third ionization source may comprise an ionization bar. In this regard, for instance, the first ionization source, the static control source, and the third ionization source may be configured to actively dissipate static charge created during preparation of the PLA spunbond nonwoven fabric.

In accordance with certain embodiments, for example, the system may further comprise a humidity unit positioned within or downstream from the spin beam. In such embodiments, for instance, the humidity unit may comprise at least one of a steam unit, a fogging unit, a misting unit, or any combination thereof. In this regard, for example, humidity may be added in the spin beam during the formation of the plurality of PLA continuous filaments and/or near the press roll(s) (in those embodiments utilizing at least one press roll) in order to provide additional management of static charge that develops during the production of the PLA spunbond nonwoven fabric.

In accordance with certain embodiments, for instance, the system may be configured to prepare the PLA continuous fibers at a fiber draw speed greater than about 2500 in/min. In other embodiments, for example, the system may be configured to prepare the PLA continuous fibers at a fiber draw speed from about 3000 in/min to about 4000 in/min. In further embodiments, for instance, the system may be configured to prepare the PLA continuous fibers at a fiber draw speed from about 3000 in/min to about 5500 in/min. As such, in certain embodiments, the system may be configured to prepare the PLA continuous fibers at a fiber draw speed from at least about any of the following: 2501, 2550, 2600, 2650, 2700, 2750, 2800, 2850, 2900, 2950, and 3000 in/min and/or at most about 5500, 4000, 3950, 3900, 3850, 3800, 3750, 3700, 3650, 3600, 3550, and 3500 in/min (e.g., about 2700-3800 in/min, about 3000-3700 in/min, etc.). Such speeds are merely exemplary, as the system may be run at fiber draw speeds slower than 2500 in/min as well. However, use of fiber draw speed significantly below 2500 in/min may begin to compromise fabric properties such as strength and resistance to shrinkage.

In accordance with certain embodiments, for instance those embodiments involving the manufacture of spunbond fabrics having a basis weight from about 8 g/m2 to about 70 g/m2, the system may be configured to prepare the bonded nonwoven web comprising PLA continuous fibers from one spin beam in cooperation with a collector operating at a linear speed of approximately 50 to 450 in/min, or from two spin beams in cooperation with a collector operating at a linear speed of approximately 100 to 900 in/min, or from three spin beams in cooperation with a collector operating at a linear speed of approximately 150 to 1200 in/min. In this regard, one of ordinary skill in the art would appreciate that the polymer thru-put though the spinneret should generally coordinate with the collector speed to achieve a desired spunbond basis weight.

In accordance with certain embodiments, for example, the calender may comprise a pair of cooperating rolls including a patterned roll. In such embodiments, for instance, the patterned roll may comprise a three-dimensional geometric bonding pattern. In some embodiments, for example, the bonding pattern may comprise at least one of a diamond pattern, a hexagonal dot pattern, an oval-elliptic pattern, a rod-shaped pattern, or any combination thereof. However, any pattern known in the art may be used with typical embodiments employing continuous or discontinuous patterns. In some embodiments, both rolls of the calender roll may be patterned, or alternatively, one of the rolls may include a pattern while the other roll comprises an anvil roll.

Figure 4A:
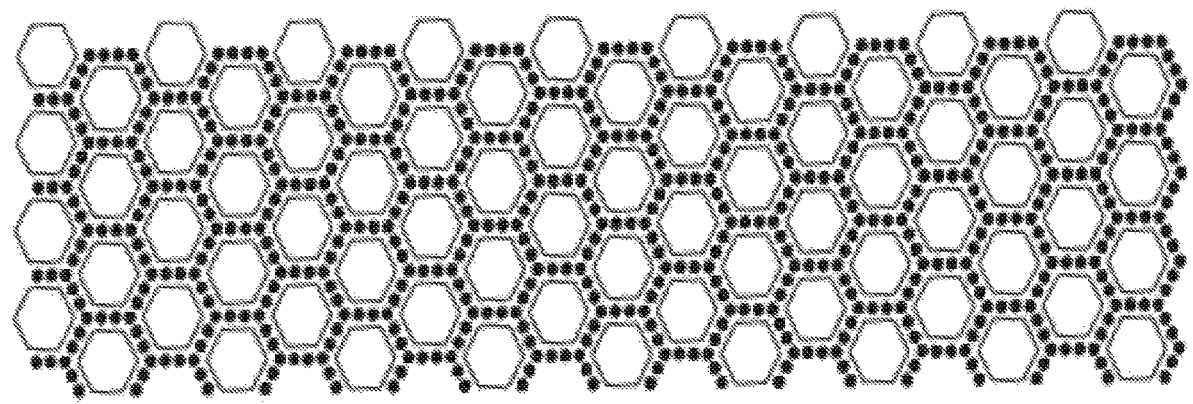
FIGS. 4A-4D illustrate bond patterns used with the PLA spunbond nonwoven fabric preparation system in accordance with certain embodiments of the invention.
Figure 4B:
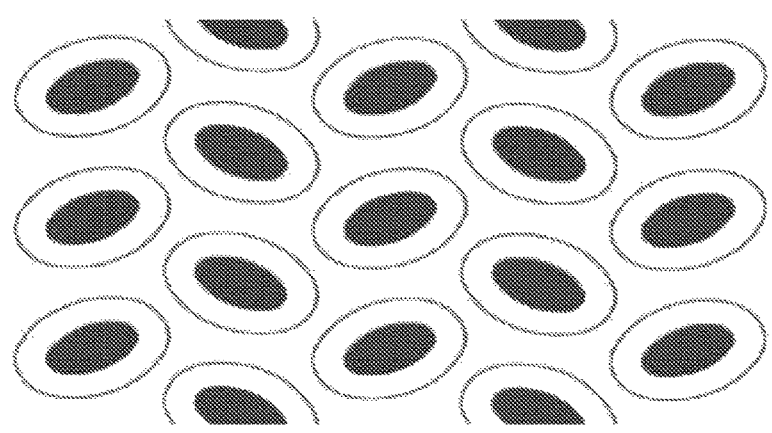
Figure 4C:
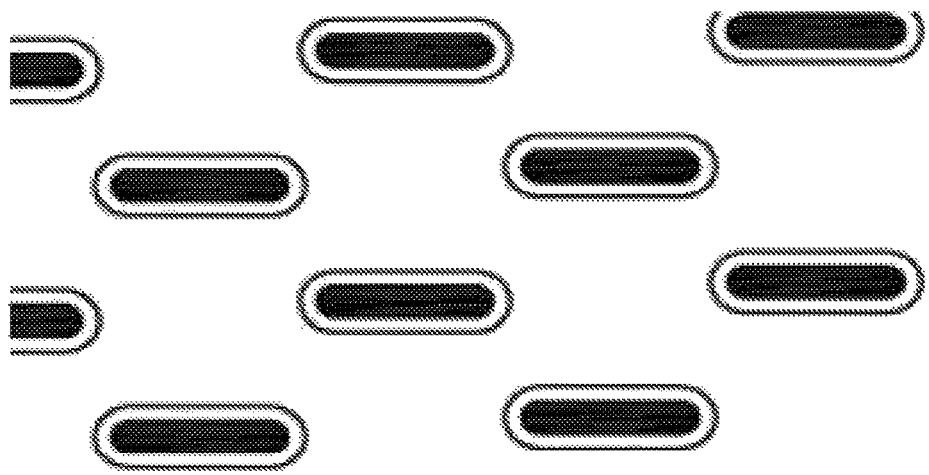
Figure 4D:
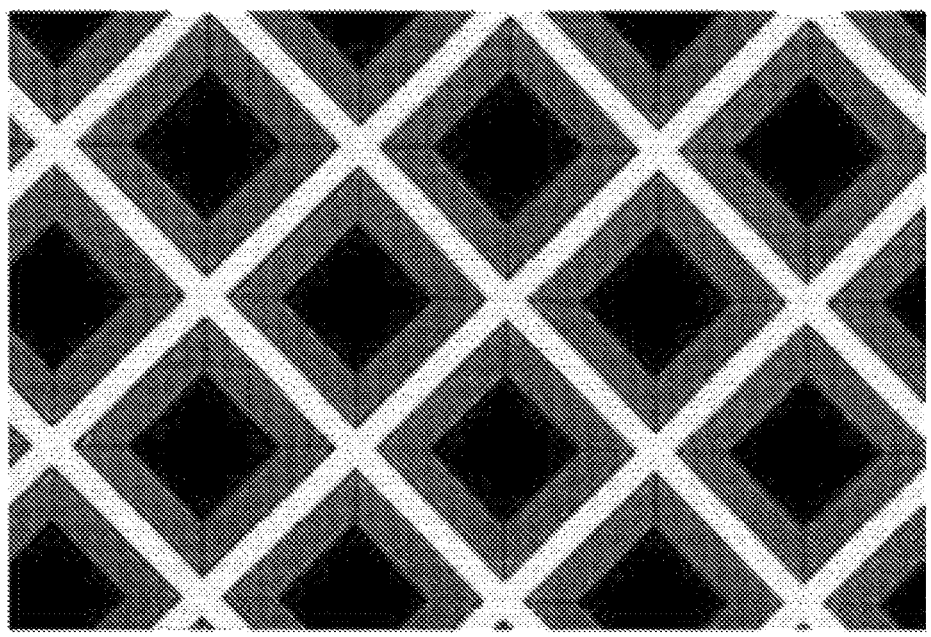

FIGS. 4A-4D, for example, illustrate bond patterns used with the PLA spunbond nonwoven fabric preparation system in accordance with certain embodiments of the invention. FIG. 4A illustrates a hexagonal dot pattern 60a, FIG. 4B illustrates an oval-elliptic pattern 60b, FIG. 4C illustrates a rod-shaped pattern 60c, and FIG. 4D illustrates a diamond pattern 60d.

In certain embodiments, for instance, the bonding pattern may cover from about 5% to about 30% of the surface area of the patterned roll. In other embodiments, for example, the bonding pattern may cover from about 10% to about 25% of the surface area of the patterned roll. As such, in certain embodiments, the bonding pattern may cover from at least about any of the following: 5, 6, 7, 8, 9, and 10% and/or at most about 30, 29, 28, 27, 26, and 25% (e.g., about 8-27%, about 10-30%, etc.). In some embodiments, for instance, the bonding pattern may comprise the diamond pattern, and the bonding pattern covers about 25% of the surface area of the patterned roll. In further embodiments, for example, the bonding pattern may comprise the oval-elliptic pattern, and the bonding pattern covers about 18% of the surface area of the patterned roll.

In some embodiments, the calender may include a release coating to minimize deposit of molten or semi molten polymer on the surfaces of one or more of the rolls. As an example, such release coatings are described in European Patent Applicant No. 1,432,860, which is incorporated herein in its entirety by reference. In this regard, the release coating may help prevent and reduce sticking of the nonwoven fabric to the calender roll should molten polymer drips be released by spinning faults within the spin beam.

In accordance with certain embodiments, the PLA spunbond nonwoven fabric is substantially free of synthetic polymer components, such as petroleum-based materials and polymers. For example, the PLA spunbond nonwoven fabric may have a monocomponent structure in which 100% of the fiber is PLA, or may have a bicomponent structure in which the both components are PLA based to thus produce a fiber that is 100% PLA.

As used herein, "100% PLA" may also include up to 5% additives including additives and/or masterbatches of additives to provide, by way of example only, color, softness, slip, antistatic protection, lubricity, hydrophilicity, liquid repellency, antioxidant protection and the like. In this regard, the nonwoven may comprise 95-100% PLA, such as from 96-100% PLA, 97-100% PLA, 98-100% PLA, 99-100% PLA, etc. When such additives are added as a masterbatch, for instance, the masterbatch carrier may primarily comprise PLA in order to facilitate processing and to maximize sustainable content within the formulation.

Generally, polylactic acid based polymers are prepared from dextrose, a source of sugar, derived from field corn. In North America corn is used since it is the most economical source of plant starch for ultimate conversion to sugar. However, it should be recognized that dextrose can be derived from sources other than corn. Sugar is converted to lactic acid or a lactic acid derivative via fermentation through the use of microorganisms. Lactic acid may then be polymerized to form PLA. Examples of such high performance PLA resins include L105, L130, L175, and LX175, all from Corbion of Arkelsedijk 46, 4206 A C Gorinchem, the Netherlands. Thus, besides corn other agricultural based sugar source could be used including rice, sugar beets, sugar cane, wheat, cellulosic materials, such as xylose recovered from wood pulping, and the like.

In some embodiments, the nonwoven fabrics may be biodegradable. "Biodegradable" refers to a material or product which degrades or decomposes under environmental conditions that include the action of microorganisms. Thus, a material is considered as biodegradable if a specified reduction of tensile strength and/or of peak elongation of the material or other critical physical or mechanical property is observed after exposure to a defined biological environment for a defined time. Depending on the defined biological conditions, a fabric comprised of PLA might or might not be considered biodegradable.

A special class of biodegradable products made with a bio-based material might be considered as compostable if it can be degraded in a composing environment. The European standard EN 13432, "Proof of Compostability of Plastic Products" may be used to determine if a fabric or film comprised of sustainable content could be classified as compostable.

In some embodiments, sustainable polymer components of biodegradable products may be derived from an aliphatic component possessing one carboxylic acid group (or a polyester forming derivative thereof, such as an ester group) and one hydroxyl group (or a polyester forming derivative thereof, such as an ether group) or may be derived from a combination of an aliphatic component possessing two carboxylic acid groups (or a polyester forming derivative thereof, such as an ester group) with an aliphatic component possessing two hydroxyl groups (or a polyester forming derivative thereof, such as an ether group).

The term "aliphatic polyester" covers—besides polyesters which are made from aliphatic and/or cycloaliphatic components exclusively also polyesters which contain besides aliphatic and/or cylcoaliphatic units aromatic units, as long as the polyester has substantial sustainable content. As noted above, the sustainable content is typically at least 25 weight %, and more preferably 75 weight % and even more preferably at least 90 weight %.

Polymers derived from an aliphatic component possessing one carboxylic acid group and one hydroxyl group are alternatively called polyhydroxyalkanoates (PHA). Examples thereof are polyhydroxybutyrate (PHB), poly-(hydroxybutyrate-co-hydroxyvaleterate) (PHBV), poly-(hydroxybutyrate-co-polyhydroxyhexanoate) (PHBH), polyglycolic acid (PGA), poly-(epsilon-caprolactone) (PCL) and preferably polylactic acid (PLA).

Examples of polymers derived from a combination of an aliphatic component possessing two carboxylic acid groups with an aliphatic component possessing two hydroxyl groups are polyesters derived from aliphatic diols and from aliphatic dicarboxylic acids, such as polybutylene succinate (PBSU), polyethylene succinate (PESU), polybutylene adipate (PBA), polyethylene adipate (PEA), polytetramethylene adipate/terephthalate (PTMAT).

In accordance with certain embodiments, for example, the nonwoven fabric may comprise bicomponent fibers. In some embodiments, for instance, the bicomponent fibers may comprise a side-by-side arrangement. However, in other embodiments, for example, the bicomponent fibers may comprise a sheath and a core. In some embodiments, the bicomponent fibers can be made using sheath/core bicomponent fibers where the core comprises PLA, and the sheath comprises polymers including, but not limited to, polypropylene (PP), polyethylene (PE), polyethylene terephthalate (PET) and/or the like. However, in other embodiments, the nonwoven fabric may comprise reverse bicomponent fibers where the core comprises polymers including, but not limited to, PP, PE, PET and/or the like, and the sheath comprises PLA.

In such embodiments, for instance, the sheath may comprise PLA. In further embodiments, for example, the core may comprise at least one synthetic polymer component. For example, the PLA continuous filaments may comprise a PLA sheath, and a synthetic polymer, such as PP, PE, PET, or any combination thereof. In other embodiments, the core may comprise PLA in which the PLA may have a higher or lower melting temperature than the PLA of the sheath. In this regard, the bicomponent fibers may comprise PLA/PP reverse bicomponent fibers, PLA/PE reverse bicomponent fibers, PLA/PET reverse bicomponent fibers, or PLA/PLA reverse bicomponent fibers.

In certain embodiments, for instance, the bicomponent fibers may comprise PLA/PLA reverse bicomponent fibers such that the sheath comprises a first PLA grade, the core comprises a second PLA grade, and the first PLA grade and the second PLA grade are different (e.g., the first PLA grade has a higher melting point than the second PLA grade). For example, in one embodiment, the core may comprise a PLA having a lower % D isomer of polylactic acid than that of the % D isomer PLA polymer used in the sheath. The PLA polymer with lower % D isomer will show higher degree of stress induced crystallization during spinning while the PLA polymer with higher D % isomer will retain a more amorphous state during spinning. The more amorphous sheath will promote bonding while the core showing a higher degree of crystallization will provide strength to the fiber and thus to the final bonded web. In one particular embodiment, the Nature Works PLA Grade PLA 6752 with 4% D Isomer can be used as the sheath while NatureWorks Grade 6202 with 2% D Isomer can be used as the core.

By way of example only, the sheath may comprise PLA; the core may comprise at least one synthetic polymer component. The PLA grade of the starting material should have proper molecular properties to be spun in spunbond processes. Examples of suitable include PLA grades supplied from NatureWorks LLC, of Minnetonka, Minn. 55345 such as, grade 6752D, 6100D, and 6202D believed to be produced as generally following the teaching of U.S. Pat. Nos. 5,525,706 and 6,807,973 both to Gruber et al.

Examples of synthetic polymer components include polyolefins, such as PP and PE, blends of polyolefins, such as those taught by Chester et al. in US Patent Publication No. 2014/0276517 incorporated herein in its entirety by reference, polyesters, such as PET, polytrimethylene terephthalate (PTT), and polybutylene terephthalate (PBT), polystyrenes, and the like.

A wide variety of polypropylene polymers may be used in the starting material including both polypropylene homopolymers and polypropylene copolymers. In one embodiment, the polypropylene of the starting material may comprise a metallocene or Ziegler Natta catalyzed propylene polymers.

Examples of Ziegler Natta polypropylenes that may be used in embodiments of the present invention include TOTAL®3866 polypropylene from Total Petrochemicals USA, INC of Houston, Tex.; Braskem CP 360H polypropylene from Braskem America of Philadelphia, Pa.; ExxonMobil PD 3445 from ExxonMobil of Houston, Tex.; Sabic 511A from Sabic of Sittard, The Netherlands; and Pro-fax PH 835 from Basell Polyolefins of Wilmington, Del. Examples of suitable metallocene polypropylenes may include TOTAL® M3766 polypropylene from Total Petrochemicals USA, INC of Houston, Tex.; TOTAL® MR 2001 polypropylene from Total S.A. of Courbevoie, France; ACHIEVE® 3754 polypropylene from ExxonMobil of Houston, Tex.; and ACHIEVE® 3825 polypropylene from ExxonMobil of Houston, Tex.

For example, in one embodiment, the system may be configured to produce a nonwoven comprising a PLA sheath and a polyolefin core.

In some embodiments, the system may be configured to prepare the PLA spunbond nonwoven fabric at a fiber draw speed from about 3000 m/min to about 5500 m/min. In other embodiments, for instance, each of the sheath and the core may comprise PLA, and the system may be configured to prepare the PLA spunbond nonwoven fabric at a fiber draw speed from about 3000 m/min to about 4000 m/min.

However, in other embodiments, for example, the nonwoven fabric may comprise PLA monocomponent fibers. In this regard, the nonwoven fabric may be 100% PLA.

Figure 3A:
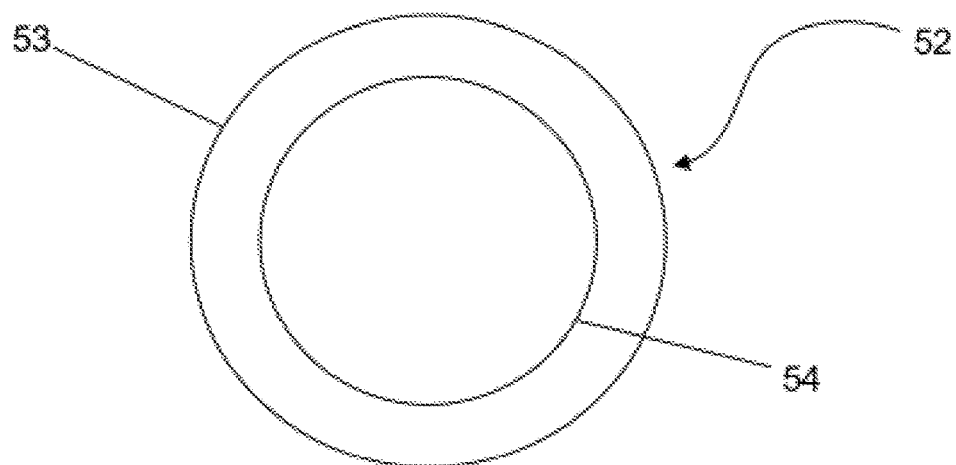
FIGS. 3A-3C illustrate fibers formed by the PLA spunbond nonwoven fabric preparation system in accordance with certain embodiments of the invention.
Figure 3B:
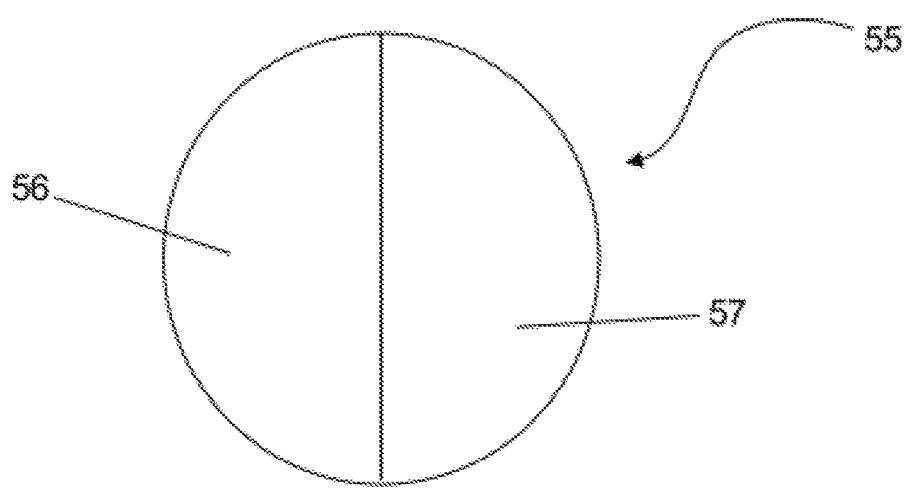
Figure 3C:
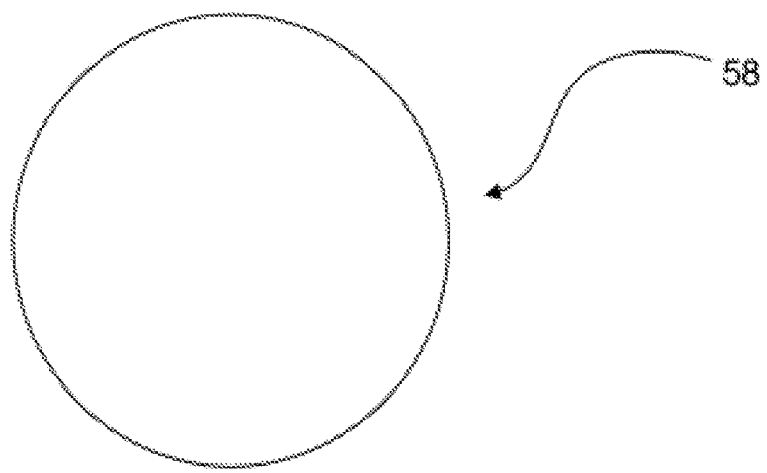

FIGS. 3A-3C, for example, illustrate fibers formed by the PLA spunbond nonwoven fabric preparation system in accordance with certain embodiments of the invention. As shown in FIG. 3A, the fiber may be a sheath/core bicomponent fiber 52 having a sheath 53 and a core 54, as more fully described above. FIG. 3B illustrates a side-by-side bicomponent fiber 55 having a first continuous polymer 56 and a second continuous polymer 57. Finally, FIG. 3C illustrates a monocomponent fiber 58.

According to certain embodiments, the PLA spunbond nonwoven fabric comprises a spunbond fabric or a spunbond-meltblown-spunbond (SMS) fabric. In certain embodiments in which the PLA spunbond nonwoven fabric comprises a SMS fabric, the spunbond nonwoven layer may comprise bicomponent fibers having a PLA sheath and a PLA core, and a meltblown layer comprising PLA fibers. In such embodiments, each of the spunbond and meltblown layers may comprise PLA on the surface of the fibers. An example of a suitable PLA material for use as the sheath is PLA grade 6752 with 4% D Isomer, and an example of a suitable PLA material for use as the core is PLA grade 6202 with 2% D Isomer, both of which are available from NatureWorks. A suitable material for the PLA meltblown fibers is PLA grade 6252, which is also available from NatureWorks.

III. Process for Preparing PLA Spunbond Nonwoven Fabrics

In another aspect, certain embodiments according to the invention provide processes for preparing a PLA spunbond nonwoven fabric. In accordance with certain embodiments, the process includes providing a stream of molten or semi-molten PLA resin, forming a plurality of drawn PLA continuous filaments, depositing the plurality of PLA continuous filaments onto a collection surface, exposing the plurality of PLA continuous filaments to ions, and bonding the plurality of PLA continuous filaments to form the PLA spunbond nonwoven fabric.

Figure 5:
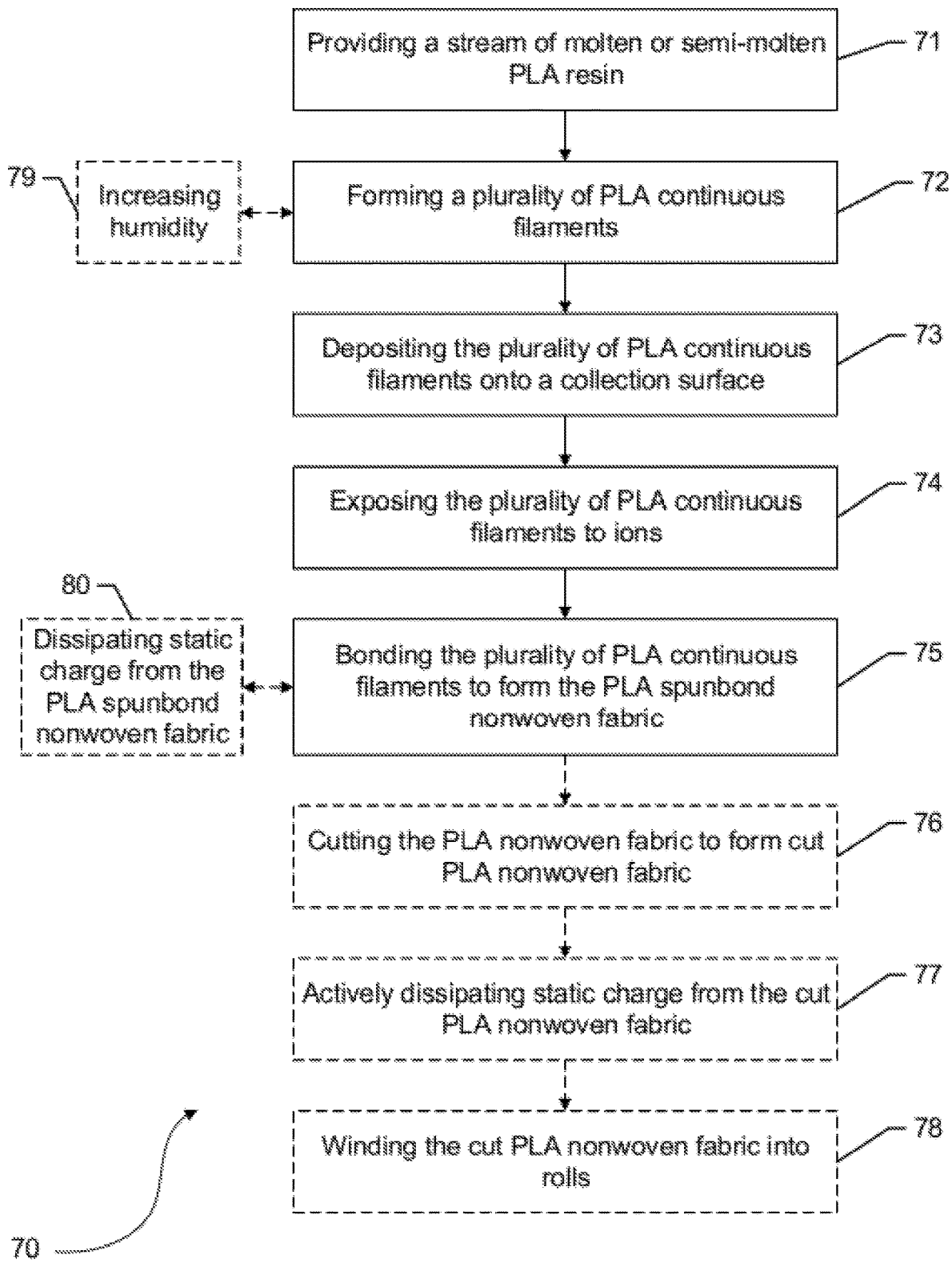
FIG. 5 is a block diagram of a process for preparing the PLA spunbond nonwoven fabric in accordance with certain embodiments of the invention.

FIG. 5, for example, is a block diagram of a process for preparing the PLA spunbond nonwoven fabric in accordance with certain embodiments of the invention. As shown in FIG. 5, the process 70 includes providing a stream of molten or semi-molten PLA resin at operation 71, forming a plurality of drawn PLA continuous filaments at operation 72, an optional step of increasing humidity during the forming step at operation 79, depositing the plurality of PLA continuous filaments onto a collection surface at operation 73 where said depositing step 73 is often aided by a vacuum box under said collection surface, exposing the plurality of PLA continuous filaments to ions at operation 74, bonding the plurality of PLA continuous filaments to form the PLA spunbond nonwoven fabric at operation 75, and an optional step of dissipating static charge from the PLA spunbond nonwoven fabric before or after the bonding step at operation 80. In addition, the process 70 includes the optional steps of cutting the PLA spunbond nonwoven fabric to form cut PLA spunbond nonwoven fabric at operation 76, actively dissipating static charge from the cut PLA spunbond nonwoven fabric at operation 77, and winding the cut PLA spunbond nonwoven fabric into rolls at operation 78.

Figure 6:
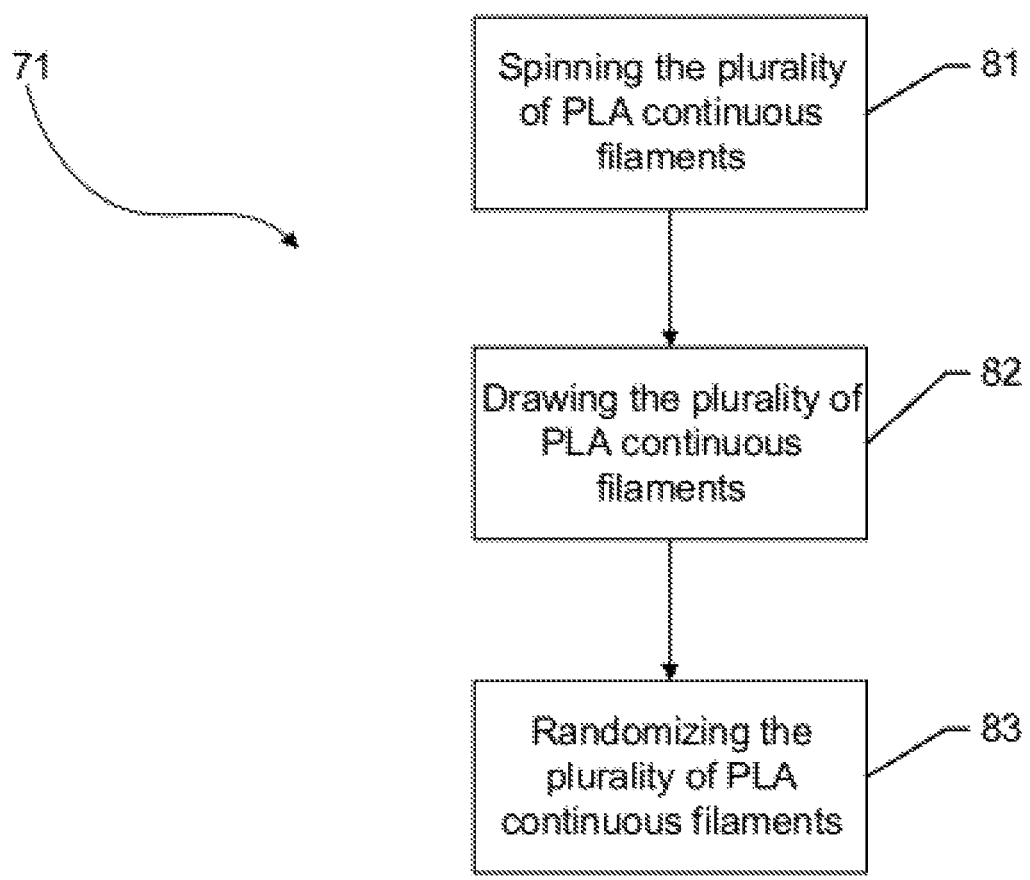
FIG. 6 is a block diagram of the process for forming PLA continuous filaments in accordance with the process illustrated in the block diagram of FIG. 5.

According to certain embodiments, for example, forming the plurality of attenuated or drawn PLA continuous filaments may comprise spinning the plurality of PLA continuous filaments, drawing the plurality of PLA continuous filaments, and randomizing the plurality of PLA continuous filaments. FIG. 6, for example, is a block diagram of the process for forming drawn PLA continuous filaments in accordance with the process illustrated in the block diagram of FIG. 5. As shown in FIG. 6, the forming step 71 includes spinning the plurality of PLA continuous filaments at operation 81, drawing the plurality of PLA continuous filaments at operation 82, and randomizing the plurality of PLA continuous filaments at operation 83.

In this regard, the spunbond nonwoven web may be produced, for example, by the conventional spunbond process wherein molten polymer is extruded into continuous filaments which are subsequently quenched, attenuated or drawn mechanically by draw rolls or pneumatically by a high velocity fluid, and collected in random arrangement on a collecting surface. After filament collection, any thermal, chemical or mechanical bonding treatment may be used to form a bonded web such that a coherent web structure results.

In accordance with certain embodiments, for instance, the system may be configured to prepare the PLA continuous fibers at a fiber draw speed greater than about 2500 in/min. In other embodiments, for example, the system may be configured to prepare the PLA continuous fibers at a fiber draw speed from about 3000 in/min to about 4000 in/min. In further embodiments, for instance, the system may be configured to prepare the PLA continuous fibers at a fiber draw speed from about 3000 in/min to about 5500 in/min. As such, in certain embodiments, the system may be configured to prepare the PLA continuous fibers at a fiber draw speed from at least about any of the following: 2501, 2550, 2600, 2650, 2700, 2750, 2800, 2850, 2900, 2950, and 3000 in/min and/or at most about 5500, 4000, 3950, 3900, 3850, 3800, 3750, 3700, 3650, 3600, 3550, and 3500 in/min (e.g., about 2700-3800 in/min, about 3000-3700 in/min, etc.). Such speeds are merely exemplary, as the system may be run at fiber draw speeds slower than 2500 in/min as well. However use of fiber draw speed significantly below 2500 in/min may begin to compromise fabric properties such as strength and resistance to shrinkage.

In accordance with certain embodiments, for instance those embodiments involving the manufacture of spunbond fabrics having a basis weight from about 8 g/m2 to about 70 g/m2, the system may be configured to prepare the bonded nonwoven web comprising PLA continuous fibers from one spin beam in cooperation with a collector operating at a linear speed of approximately 50 to 450 in/min, or from two spin beams in cooperation with a collector operating at a linear speed of approximately 100 to 900 in/min, or from three spin beams in cooperation with a collector operating at a linear speed of approximately 150 to 1200 in/min. In this regard, one of ordinary skill in the art would appreciate that the polymer thru-put though the spinneret should generally coordinate with the collector speed to achieve a desired spunbond basis weight.

In accordance with certain embodiments, for example, forming the plurality of PLA continuous filaments may comprise forming bicomponent fibers. In some embodiments, for instance, forming bicomponent fibers may comprise forming side-by-side bicomponent fibers. In other embodiments, however, forming bicomponent fibers may comprise forming bicomponent fibers having a sheath and a core. In such embodiments, for example, the sheath may comprise PLA. In further embodiments, for instance, the core may comprise at least one different polymer component, such as polypropylene, polyethylene, polyethylene terephthalate, PLA, and the like, or any combination thereof. In certain embodiments, for example, the bicomponent fibers may comprise PLA such that the sheath may comprise a first PLA grade, the core may comprise a second PLA grade, and the first PLA grade and the second PLA grade may be different. In further embodiments, for instance, the sheath may comprise PLA, the core may comprise at least one of polypropylene, polyethylene, or polyethylene terephthalate, and the process may occur at a fiber draw speed of about 3000 in/min. In other embodiments, for example, each of the sheath and the core may comprise PLA, and the process may occur at a fiber draw speed of about 3500 in/min or a fiber draw speed of about 4000 in/min or even at a fiber draw speed of nearly 5500 in/min.

However, in other embodiments, for instance, the nonwoven fabric may comprise PLA monocomponent fibers. According to certain embodiments, for example, the PLA spunbond nonwoven fabric may comprise a spunbond fabric or a spunbond-meltblown-spunbond (SMS) fabric. In embodiments in which the PLA spunbond nonwoven fabric comprises an SMS fabric, each of the spunbond and meltblown layers may comprise PLA on the surface of their respective fibers.

In accordance with certain embodiments, for instance, bonding the web to form the PLA spunbond nonwoven fabric may comprise thermal point bonding the web with heat and pressure via a calender having a pair of cooperating rolls including a patterned roll. In such embodiments, for example, thermal point bonding the web may comprise imparting a three-dimensional geometric bonding pattern onto the PLA spunbond nonwoven fabric. In some embodiments, for instance, imparting the bonding pattern onto the PLA spunbond nonwoven fabric may comprise imparting at least one of a diamond pattern, a hexagonal dot pattern, an oval-elliptic pattern, a rod-shaped pattern, or any combination thereof.

In certain embodiments, for example, the bonding pattern may cover from about 5% to about 30% of the surface area of the patterned roll. In other embodiments, for instance, the bonding pattern may cover from about 10% to about 25% of the surface area of the patterned roll. As such, in certain embodiments, the bonding pattern may cover from at least about any of the following: 5, 6, 7, 8, 9, and 10% and/or at most about 30, 29, 28, 27, 26, and 25% (e.g., about 8-27%, about 10-30%, etc.). By way of example only, the bonding pattern may comprise the diamond pattern, and the bonding pattern may cover about 25% of the surface area of the patterned roll. In further embodiments, for instance, the bonding pattern may comprise the oval-elliptic pattern, and the bonding pattern may cover about 18% of the surface area of the patterned roll. In some embodiments, for example, the calender may comprise a release coating. As understood by one of ordinary skill in the art, the nonwoven strength resulting from calendar bonding is a complex function of the % area covered by the bond, temperature of the calender rolls, compression pressure of the rolls against the web of continuous fibers comprised of PLA, and the speed of the web through the calendar.

In accordance with certain embodiments, for instance, the process may further comprise dissipating static charge from the PLA spunbond nonwoven fabric proximate to the calender via the static control unit. In some embodiments, for example, the static control unit may comprise a second ionization source. In further embodiments, for instance, the second ionization unit may comprise an ionization bar. However, in other embodiments, for example, dissipating static charge from the PLA spunbond nonwoven fabric may comprise contacting the PLA spunbond nonwoven fabric with a static bar.

In accordance with certain embodiments, for instance, the process may further comprise cutting the PLA spunbond nonwoven fabric to form cut PLA spunbond nonwoven fabric, exposing the cut PLA spunbond nonwoven fabric to ions via a third ionization source, and winding the cut PLA spunbond nonwoven fabric into rolls. In such embodiments, for example, the third ionization unit may comprise an ionization bar.

In accordance with certain embodiments, for instance, the process may further comprise increasing humidity while forming the plurality of PLA continuous filaments. In such embodiments, for example, increasing humidity may comprise applying at least one of steam, fog, mist, or any combination thereof to the plurality of PLA continuous filaments.

Fabrics prepared in accordance with embodiments of the invention may have a wide variety of basis weight ranges depending on the desired application. For example, fabrics and laminates incorporating the spunbond webs discussed herein may have basis weights ranging from about 7 to 150 gsm, and in particular, from about 8 to 70 gsm. In some embodiments, the spunbond webs may have basis weights ranging from 10 to 50 gsm, for example, from about 11 to 30 gsm.

Moreover, fabrics prepared in accordance with embodiments of the invention may be characterized by an area shrinkage of less than 5%. In further embodiments, for example, the fabrics may be characterized by an area shrinkage of less than 2%. In accordance with embodiments of the invention, the ionization source may permit faster fiber draw speeds, which results may result in lower shrinkage.

Fabrics prepared in accordance with embodiments of the invention may be used in wide variety of applications including diapers, feminine care products, incontinence products, agricultural products (e.g., root wraps, seed bags, crop covers and/or the like), industrial products (e.g. work wear coveralls, airline pillows, automobile trunk liner and sound proofing), and household products (e.g., furniture scratch pads, mattress coil covers and/or the like). In these applications, the fabric may be incorporated into a multi-layered structure.

In addition, spunbond webs prepared in accordance with embodiments of the present invention may be used in the production in a variety of different multilayer structures included meltblown/spunbond (MS) laminates, spunbond/meltblown/spunbond (SMS) laminates, and spunbond/meltblown/meltblown/spunbond (SMMS) laminates, for example. In these multilayer structures, the basis weight may range from as low as about 7 g/m2 and up to about 150 g/m2. In such multilayered laminates, both the meltblown and spunbond fibers could have PLA polymer on the surface to insure optimum bonding.

In some embodiments in which the spunbond layer is a part of a multilayer structure (e.g., MS, SMS, and SMMS), the amount of the spunbond in the structure may range from about 5 to 30% and in particular, from about 10 to 25% of the structure as a percentage of the structure as a whole.

In addition, spunbond webs in accordance with embodiments of the present invention may also be used in industrial applications including filters, cleaning products, "pigs" to absorb spilt oil or (if treated with surfactant) to absorb contaminated materials from water, and the like. In these applications, the spunbond webs may have higher basis weight ranges that may range from about 20 to 80 g/m2.

Multilayer structures in accordance with embodiments can be prepared in a variety of manners including continuous in-line processes where each layer is prepared in successive order on the same line, or depositing a meltblown layer on a previously formed spunbond layer. The layers of the multilayer structure can be bonded together to form a multilayer composite sheet material using thermal bonding, mechanical bonding, adhesive bonding, hydroentangling, or combinations of these. In certain embodiments, the layers are thermally point bonded to each other by passing the multilayer structure through a pair of calender rolls.

EXAMPLES

The following examples are provided for illustrating one or more embodiments of the present invention and should not be construed as limiting the invention.

Nonwoven fabrics in the following examples were prepared via a Reifenhaeuser Reicofil-3 line or Reicofil-4 line. Each of the examples were prepared using the setup described in Example 1 unless otherwise indicated. Moreover, unless otherwise indicated all percentages are weight percentages. The materials used in the examples are identified below.

Test Methods

Titer was calculated from microscopic measurement of fiber diameter and known polymer density per German textile method C-1570.

Basis Weight was determined generally following the German textile method CM-130 from the weight of 10 layers of fabric cut into 10×10 cm squares.

Tensile was determined in accordance with Method 10 DIN 53857 using a sample with 5 cm width, 100 mm gauge length, and cross-head speed of 200 min/min.

Elongation was determined in accordance with Method 10 DIN 53857 using a sample with 5 cm width, 100 mm gauge length, and cross-head speed of 200 min/min.

Fabric Shrinkage was determined by cutting three samples taken across the web width of nominal dimensions of MD of 29.7 cm and CD of 21.0 cm; measuring the actual MD and CD width at three locations in the sheet; placing the sample in water heated to 60 C for 1 minute; and remeasuring the MD and CD dimensions at the above three locations. The average width measurement after exposure divided by the original measurement×100% yielded the % Shrinkage. A low % shrinkage value suggests that the continuous fibers comprising PLA have been spun and drawn at sufficient speed to yield after bonding a high strength stable fabric.

Example 1

Example 1 was related to the production of PP/PLA bicomponent nonwoven webs made using a Reicofil-3 beam and both R-3 and R-4 press rolls such that after lay-down and compression from the R-3 press roll, the web traversed some distance on the collection surface and go under the R-4 press roll before moving to the bonding station comprising the smooth and embossing rolls of the calender. The web was a 50/50 bicomponent nonwoven web with the sheath being LyondellBasell Z/N HP561R PP and the core 6202D PLA from NatureWorks. The web was produced using spin beam temperatures of 235° C. at the extruder and 240° C. at the die, a fiber draw speed of 2700 in/min, and a line speed of 149 in/min. The calender had a diamond bonding pattern covering 25% of the surface area of the pattern roll, a calender temperature of 150° C. for each of the pattern roll and the anvil roll, and a calender pressure of 70 N/mm. A passive static bar was positioned approximately 8-12 inches downstream of the calender.

The nonwoven fabric of Example 1 was produced with one Ionis Elektrostatik Discharging Electrode E3412 (i.e. ionization bar) positioned above and extending over the collection surface in the cross direction and placed approximately 1 to 3 inches above the collection surface and approximately 2 to 3 inches downstream from the R-3 press roll. A second Ionis Elektrostatik Discharging Electrode E3412 (i.e. ionization bar) was placed in exactly the same corresponding position above the collection surface downstream of both the R-3 and the R-4 press rolls. Both ionization bars were energized to insure that the web comprising PLA fibers did not wrap either the R-3 press roll or the R-4 press roll. A third Ionis Elektrostatik Discharging Electrode E3412 (i.e. ionization bar) was placed between the calender and the winder to protect the winder operators from electric shock when handling the cut (i.e. slit rolls) produced during the trial. Properties of Example 1 are summarized in Tables 1 and 2 below.

Examples 2 and 3

Examples 2 and 3 were related to the production of spunbond fabrics with PLA on the fabric surface using a Reicofil-3 beam. The web was a reverse bicomponent sheath/core 40/60 PLA/PP NatureWorks Grade 6752/LyondellBasell HP561R PP produced using ionization bars. The webs of Examples 2 and 3 were produced using spin beam temperatures of 235° C. at the extruder and 240° C. at the die, and a line speed of 149 in/min. Example 2 was formed at a fiber draw speed of 2900 in/min. The calender for Example 2 had a diamond bonding pattern covering 25% of the surface area of the pattern roll, calender temperatures of 160° C. for the pattern roll and 125° C. for the anvil roll, and a calender pressure of 50 N/mm.

However, Example 3 was formed at a fiber draw speed of 3300 in/min, and the calender for Example 3 had calender temperatures of 145° C. for the pattern roll and 125° C. for the anvil roll and a calender pressure of 50 N/mm. Properties of Examples 2 and 3 are summarized in Tables 1 and 2 below.

Examples 4 and 5

Examples 4 and 5 were related to the production of spunbond fabrics made of 100% bicomponent PLA using a Reicofil-3 beam. The web was a bicomponent sheath/core 40/60 NatureWorks Grade 6752/NatureWorks Grade 6202 100% PLA using ionization bars and steam. The webs of Examples 4 and 5 were produced using spin beam temperatures of 235° C. at the extruder and 240° C. at the die and a line speed of 119 in/min. Example 4 was formed at a fiber draw speed of 3300 in/min. The calender for Example 4 had a diamond bonding pattern covering 25% of the surface area of the pattern roll, had calender temperatures of 135° C. for the pattern roll and 125° C. for the anvil roll, and a calender pressure of 70 N/mm.

However, Example 5 was formed at a fiber draw speed of 3500 in/min, and the calender of Example 5 had calender temperatures of 140° C. for the pattern roll and 125° C. for the anvil roll and a calender pressure of 70 N/mm. Properties of Examples 4 and 5 are summarized in Tables 1 and 2 below.

Examples 6 and 7

Examples 6 and 7 were related to a bicomponent 100% PLA fabric made without using ionization bars or passive static bars but rather using steam added to the quench air to optimize moisture to minimize static. The fabrics were 100% bicomponent 50/50 Sheath/Core NatureWorks Grade 6752/NatureWorks Grade 6202 using a Reicofil-4 beam. The web of Example 6 was produced using spin beam temperatures of 230° C. for both the extruder and the die, a fiber draw speed of 3600 in/min, and a line speed of 150 m/min. The calender for Example 6 had calender temperatures of 139° C. for the pattern roll and 134° C. for the anvil roll and a calender pressure of 80 N/mm.

However, the web of Example 7 was produced using spin beam temperatures of 235° C. for both the extruder and the die, a fiber draw speed of 4100, and a line speed of 170 m/min. The calender for Example 7 had calender temperatures of 139° C. for the pattern roll and 134° C. for the anvil roll and a calender pressure of 45 N/mm. Properties of Examples 6 and 7 are summarized in Table 1 and 2 below.

Examples 8 and 9

Examples 8 and 9 were related to a 100% PLA bicomponent fabric made on a Reicofil-4 beam. The setup differed from Example 1 in that one Ionis Elektrostatik Discharging Electrode E3412 (i.e. ionization bar) was positioned above and extending over the collection surface in the cross direction and placed approximately 1 to 3 inches above the collection surface and 2 to 3 inches downstream of the R-4 press roll. Because the R-4 spin beam was downstream of the R-3 spin beam, there was no concern about wrapping the R-3 press roll. Accordingly, the ionization bar from the R-3 beam was de-energized during production of Examples 8 and 9.

The fabrics were bicomponent 30/70 NatureWorks Grade 6752/NatureWorks Grade 6202/sheath/core made with ionization bars as discussed above to minimize static. The webs of Examples 8 and 9 were produced at spin beam temperatures of 235° C. at the extruder and 240° C. at the die. The web of Example 8 was produced at a fiber draw speed of 3600 in/min and a line speed of 145 m/min. The calender for Example 8 had calender temperatures of 160° C. for the pattern roll and 147° C. for the anvil roll and a calender pressure of 40 N/mm.

However, the web of Example 9 was produced using a fiber draw speed of 3800 m/min and a line speed of 90 m/min. The calender for Example 9 had calender temperatures of 160° C. for the pattern roll and 147° C. for the anvil roll and a calender pressure of 40 N/mm. Properties of Examples 8 and 9 are summarized in Tables 1 and 2 below.

TABLE 1

Nonwoven Mechanical Properties

| Example Units | Titer DTEX | Basis Weight g/m² | MD Tensile N/5 cm | MD Tensile per Basis Weight N-sm/g-5cm | CD Tensile N/5 cm | CD Tensile per Basis Weight N-sm/g-5cm | MD % Elong. % | CD % Elong. % | MD Toughness Index Tensile X % | CD Toughness Index Tensile X % |
|---|---|---|---|---|---|---|---|---|---|---|
| 1 | 2.3 | 20.3 | 49.8 | 2.453 | 23.9 | 1.177 | 36.9 | 43.06 | 1838 | 1029 |
| 2 | 2.2 | 20.3 | 33.4 | 1.645 | 14.0 | 0.690 | 16.9 | 23.37 | 564 | 327 |
| 3 | 1.9 | 20.3 | 28.4 | 1.399 | 12.3 | 0.606 | 16.4 | 30.51 | 466 | 375 |
| 4 | 1.9 | 25.9 | 33.7 | 1.301 | 11.6 | 0.448 | 15.7 | 27.57 | 529 | 320 |
| 5 | 1.8 | 25.9 | 37.9 | 1.463 | 14.8 | 0.571 | 19.0 | 29.66 | 720 | 439 |
| 6 | 1.94 | 24.89 | 42.28 | 1.70 | 14.36 | 0.577 | 11.27 | 26.56 | 476 | 381 |
| 7 | 1.68 | 22.24 | 32.35 | 1.45 | 10.10 | 0.454 | 8.60 | 23.76 | 278 | 240 |
| 8 | 1.8 | 23.8 | 35.1 | 1.47 | 13.0 | 0.546 | 13.3 | 24.03 | 467 | 312 |
| 9 | 1.7 | 39.8 | 70.7 | 1.78 | 26.6 | 0.668 | 14.7 | 28.61 | 1881 | 761 |

TABLE 2

Shrinkage Resistance for PLA Spunbond Fabric

| Example | Shrink (MD) % | Shrink (CD) % | Area Shrink % |
|---|---|---|---|
| 1 | 2.0 | −0.1 | 1.9 |
| 2 | 2.2 | −0.5 | 1.7 |
| 3 | 2.7 | 0.3 | 2.9 |
| 4 | — | — | — |
| 5 | 2.4 | −1.7 | 0.7 |
| 6 | — | — | — |
| 7 | — | — | — |
| 8 | 3.1 | −1.1 | 2.1 |
| 9 | 3.1 | −1.4 | 1.8 |

NON-LIMITING EXEMPLARY EMBODIMENTS

Having described various aspects and embodiments of the invention herein, further specific embodiments of the invention include those set forth in the following paragraphs.

Certain embodiments according to the invention provide systems for preparing a polylactic acid (PLA) spunbond nonwoven fabric. In accordance with certain embodiments, the system includes a first PLA source configured to provide a stream of molten or semi-molten PLA resin, a spin beam in fluid communication with the first PLA source, a collection surface disposed below an outlet of the spin beam onto which the PLA continuous filaments are deposited to form the PLA spunbond nonwoven fabric, a first ionization source positioned and arranged to expose the PLA continuous filaments to ions, and a calender positioned downstream of the first ionization source. The spin beam, according to certain embodiments, is configured to extrude and draw a plurality of PLA continuous filaments. Moreover, in some embodiments, the collection surface comprises conductive fibers.

In accordance with certain embodiments, the first ionization source is positioned above the collection surface and downstream of a point at where the PLA continuous filaments are deposited on the collection surface. However, in other embodiments, the first ionization source is positioned between the outlet of the spin beam and the collection surface. In certain embodiments, the system further comprises a press roll positioned downstream from the outlet of the spin beam. In some embodiments, the first ionization source is positioned downstream from the press roll. In other embodiments, the first ionization source is positioned between the spin beam and the press roll. However, in other embodiments, the system further comprises a vacuum source disposed below the collection surface (i.e. in lieu of a press roll).

According to certain embodiments, the first ionization source and the collection surface are separated by a distance from about 1 inch to about 24 inches. In other embodiments, the first ionization source and the collection surface are separated by a distance from about 1 inch to about 12 inches. In further embodiments, the first ionization source and the collection surface are separated by a distance from about 1 inch to about 5 inches.

In accordance with certain embodiments, the system further comprises a static control unit positioned and arranged to dissipate static from the PLA spunbond nonwoven fabric proximate to the calender. In some embodiments, the static control unit is positioned upstream from, and adjacent to, the calender. In other embodiments, however, the static control unit is positioned downstream from, and adjacent to, the calender. In some embodiments, the static control unit comprises a passive static bar. In other embodiments, however, the static control unit comprises a second ionization source.

According to certain embodiments, the system further comprises a winder positioned downstream from the calender and a third ionization source positioned and arranged to expose the PLA spunbond nonwoven fabric to ions proximate to the winder. In some embodiments, at least one of the first ionization source, the static control source (e.g., the second ionization source), and the third ionization source comprises an ionization bar extending over at least one of the plurality of PLA continuous filaments or the PLA spunbond nonwoven fabric in a cross direction. In this regard, the first ionization source, the static control source, and the third ionization source are configured to actively dissipate static charge created during preparation of the PLA spunbond nonwoven fabric.

In accordance with certain embodiments, the system further comprises a humidity unit positioned within or downstream from the spin beam. In such embodiments, the humidity unit comprises at least one of a steam unit, a fogging unit, a misting unit, or any combination thereof.

In accordance with certain embodiments, for instance, the system may be configured to prepare the PLA continuous fibers at a fiber draw speed greater than about 2500 in/min. In other embodiments, for example, the system may be configured to prepare the PLA continuous fibers at a fiber draw speed from about 3000 in/min to about 5500 in/min. In further embodiments, for instance, the system may be configured to prepare the PLA continuous fibers at a fiber draw speed from about 3000 in/min to about 4000 in/min.

In accordance with certain embodiments, the calender comprises a pair of cooperating rolls including a patterned roll. In such embodiments, the patterned roll comprises a three-dimensional geometric bonding pattern. In some embodiments, the bonding pattern comprises at least one of a diamond pattern, a hexagonal dot pattern, an oval-elliptic pattern, a rod-shaped pattern, or any combination thereof. In certain embodiments, the bonding pattern covers from about 5% to about 30% of the surface area of the patterned roll. In other embodiments, the bonding pattern covers from about 10% to about 25% of the surface area of the patterned roll. In some embodiments, the bonding pattern comprises the diamond pattern, and the bonding pattern covers about 25% of the surface area of the patterned roll. In further embodiments, the bonding pattern comprises the oval-elliptic pattern, and the bonding pattern covers about 18% of the surface area of the patterned roll. In some embodiments, the calender comprises a release coating.

In accordance with certain embodiments, the nonwoven fabric comprises bicomponent fibers. In some embodiments, the bicomponent fibers comprise a side-by-side arrangement. However, in other embodiments, the bicomponent fibers comprise a sheath and a core. In such embodiments, the sheath comprises PLA. In further embodiments, the core comprises at least one of polypropylene, polyethylene, polyethylene terephthalate, PLA, or any combination thereof. In certain embodiments, the bicomponent fibers comprise PLA such that the sheath comprises a first PLA grade, the core comprises a second PLA grade, and the first PLA grade and the second PLA grade are different. In further embodiments, the sheath comprises PLA, the core comprises at least one of polypropylene, polyethylene, or polyethylene terephthalate, and the system is configured to prepare the PLA continuous fibers at a fiber draw speed from about 3000 in/min to about 4000 in/min. In further embodiments, each of the sheath and the core comprises PLA, and the system is configured to prepare the PLA spunbond nonwoven fabric at a fiber draw speed from about 3000 in/min to about 5500 in/min. However, in other embodiments, the nonwoven fabric comprises PLA monocomponent fibers. According to certain embodiments, the PLA spunbond nonwoven fabric comprises a spunbond fabric or a spunbond-meltblown-spunbond (SMS) fabric, wherein each of a spunbond web and a meltblown web comprises fibers with PLA on a fiber surface.

In another aspect, certain embodiments according to the invention provide processes for preparing a PLA spunbond nonwoven fabric. In accordance with certain embodiments, the process includes providing a stream of molten or semi-molten PLA resin, forming a plurality of PLA continuous filaments, depositing the plurality of PLA continuous filaments onto a collection surface, exposing the plurality of PLA continuous filaments to ions, and bonding the plurality of PLA continuous filaments to form the PLA spunbond nonwoven fabric. According to certain embodiments, forming the plurality of PLA continuous filaments comprises spinning the plurality of PLA continuous filaments, drawing the plurality of PLA continuous filaments, and randomizing the plurality of PLA continuous filaments.

In accordance with certain embodiments, the process occurs at a fiber draw speed greater than about 2500 in/min. In some embodiments, the process occurs at a fiber draw speed from about 3000 in/min to about 5500 in/min. In further embodiments, the process occurs at a fiber draw speed from about 3000 in/min to about 4000 in/min.

In accordance with certain embodiments, forming the plurality of PLA continuous filaments comprises forming bicomponent fibers. In some embodiments, forming bicomponent fibers comprises forming side-by-side bicomponent fibers. In other embodiments, however, forming bicomponent fibers comprises forming bicomponent fibers having a sheath and a core. In such embodiments, the sheath comprises PLA. In further embodiments, the core comprises at least one of polypropylene, polyethylene, polyethylene terephthalate, PLA, or any combination thereof. In certain embodiments, the bicomponent fibers comprise PLA such that the sheath comprises a first PLA grade, the core comprises a second PLA grade, and the first PLA grade and the second PLA grade are different. In further embodiments, the sheath comprises PLA, the core comprises at least one of polypropylene, polyethylene, or polyethylene terephthalate, and the process occurs at a fiber draw speed from about 3000 in/min to about 4000 in/min. In some embodiments, each of the sheath and the core consist essentially of PLA, and the process occurs at a fiber draw speed from about 3000 in/min to about 5500 in/min. However, in other embodiments, the nonwoven fabric comprises PLA monocomponent fibers. According to certain embodiments, the PLA spunbond nonwoven fabric comprises a spunbond fabric or a spunbond-meltblown-spunbond (SMS) fabric, wherein each of a spunbond web and a meltblown web comprises fibers with PLA on a fiber surface.

In accordance with certain embodiments, bonding the web to form the PLA spunbond nonwoven fabric comprises thermal point bonding the web with heat and pressure via a calender having a pair of cooperating rolls including a patterned roll. In such embodiments, thermal point bonding the web comprises imparting a three-dimensional geometric bonding pattern onto the PLA spunbond nonwoven fabric. In some embodiments, imparting the bonding pattern onto the PLA spunbond nonwoven fabric comprises imparting at least one of a diamond pattern, a hexagonal dot pattern, an oval-elliptic pattern, a rod-shaped pattern, or any combination thereof. In certain embodiments, the bonding pattern covers from about 5% to about 30% of the surface area of the patterned roll. In other embodiments, the bonding pattern covers from about 10% to about 25% of the surface area of the patterned roll. In some embodiments, the bonding pattern comprises the diamond pattern, and the bonding pattern covers about 25% of the surface area of the patterned roll. In further embodiments, the bonding pattern comprises the oval-elliptic pattern, and the bonding pattern covers about 18% of the surface area of the patterned roll. In some embodiments, the calender comprises a release coating.

In accordance with certain embodiments, the process further comprises dissipating static charge from the PLA spunbond nonwoven fabric proximate to the calender via the static control unit. In some embodiments, the static control unit comprises a second ionization source. In further embodiments, the second ionization unit comprises an ionization bar extending over at least one of the plurality of PLA continuous filaments or the PLA spunbond nonwoven fabric in a cross direction. However, in other embodiments, dissipating static charge from the PLA spunbond nonwoven fabric comprises contacting the PLA spunbond nonwoven fabric with a static bar.

In accordance with certain embodiments, the process further comprises cutting the PLA spunbond nonwoven fabric to form cut PLA spunbond nonwoven fabric, exposing the cut PLA spunbond nonwoven fabric to ions via a third ionization source, and winding the cut PLA spunbond nonwoven fabric into rolls. In such embodiments, the third ionization unit comprises an ionization bar extending over at least one of the plurality of PLA continuous filaments or the PLA spunbond nonwoven fabric in a cross direction.

In accordance with certain embodiments, the process further comprises increasing humidity while forming the plurality of PLA continuous filaments. In such embodiments, increasing humidity comprises applying at least one of steam, fog, mist, or any combination thereof to the plurality of PLA continuous filaments.

Modifications of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A process for preparing a polylactic acid (PLA) spunbond nonwoven fabric, the method comprising:
    providing a stream of molten or semi-molten PLA resin;
    extruding the stream of molten or semi-molten PLA resin through a spin beam to form a plurality of PLA continuous filaments;
    depositing the plurality of PLA continuous filaments on a collection surface disposed below an outlet of the spin beam to form the PLA spunbond nonwoven fabric; and
    exposing the PLA continuous filaments to ions, wherein the step of exposing the plurality of PLA continuous filaments to ions consists of exposing the plurality of PLA continuous filaments to ions at a point downstream of where the PLA continuous filaments are deposited on the collection surface, wherein the PLA continuous filaments are only exposed to ions downstream of the point where the PLA filaments are deposited on the collection surface.

2. The process of claim 1, wherein a first ionization source is positioned above the collection surface downstream of the point at where the PLA continuous filaments are deposited on the collection surface and prior to a first roll.

3. The process of claim 2, wherein the first roll is a press roll.

4. The process of claim 1, further comprises a step of calendering the PLA spunbond nonwoven fabric.

5. The process of claim 4, wherein a calender is positioned downstream of a first ionization source.

6. The process of claim 2, wherein the first ionization source and the collection surface are separated by a distance from about 1 inch to about 24 inches.

7. The process of claim 5, further comprising a static control unit positioned and arranged to dissipate static from the PLA spunbond nonwoven fabric proximate to the calender, and wherein the static control unit comprises a passive static bar, or a second ionization source.

8. The process of claim 1, further comprising a press roll positioned downstream from the outlet of the spin beam.

9. The process of claim 7, wherein at least one of the first ionization source or second ionization source comprises an ionization bar extending over at least one of the plurality of PLA continuous filaments or the PLA spunbond nonwoven fabric in a cross direction.

10. The process of claim 1, further comprising exposing the PLA continuous filaments to ions from a second ionization source disposed downstream of a first ionization source.

11. The process of claim 10, further comprising exposing the PLA continuous filaments to ions from a third ionization source disposed downstream of the second ionization source.

12. The process of claim 11, where wherein the first ionization source, the second ionization source, and the third ionization source are configured to actively dissipate static charge created during preparation of the PLA spunbond nonwoven fabric.

13. The process of claim 5, wherein a static control unit is positioned upstream from, and adjacent to, the calender and/or positioned downstream from, and adjacent to, the calender.

14. The process of claim 5, wherein the calender comprises a pair of cooperating rolls including a patterned roll, the patterned roll comprising a three-dimensional geometric bonding pattern selected from the group consisting of one of a diamond pattern, a hexagonal dot pattern, an oval-elliptic pattern, a rod-shaped pattern, or any combination thereof.

15. The process of claim 1, wherein the PLA spunbond nonwoven fabric is drawn from the spin beam at a fiber draw speed greater than about 2500 m/min.

16. A process for preparing a polylactic acid (PLA) spunbond nonwoven fabric, the process comprising:
    providing a stream of molten or semi-molten PLA resin;
    forming a plurality of PLA continuous filaments in which PLA is present at a surface of the filaments;
    depositing the plurality of PLA continuous filaments onto a collection surface;
    exposing the plurality of PLA continuous filaments to ions, wherein the step of exposing the plurality of PLA continuous filaments to ions consists of exposing the plurality of PLA continuous filaments to ions at a point downstream of where the PLA continuous filaments are deposited on the collection surface, wherein the PLA continuous filaments are only exposed to ions downstream of the point where the PLA filaments are deposited on the collection surface; and
    bonding the plurality of PLA continuous filaments to form the PLA spunbond nonwoven fabric.

17. The process of claim 16, wherein forming the plurality of PLA continuous filaments comprises:
    spinning the plurality of PLA continuous filaments;
    drawing the plurality of PLA continuous filaments; and
    randomizing the plurality of PLA continuous filaments.

18. The process of claim 16, wherein forming the plurality of PLA continuous filaments comprises forming bicomponent fibers, and wherein the bicomponent comprises side-by-side bicomponent fibers, or fibers having a sheath and a core.

19. The process of claim 18, wherein the sheath comprises PLA.

20. The process of claim 18, wherein the core comprises at least one of polypropylene, polyethylene, polyethylene terephthalate, PLA, or any combination thereof.

21. The process of claim 18, wherein the bicomponent fibers comprise PLA such that the sheath comprises a first PLA grade, the core comprises a second PLA grade, and the first PLA grade and the second PLA grade are different.

22. The process of claim 18, wherein the process occurs at a fiber draw speed from about 3,000 m/min to about 5,500 m/min.

23. The process of claim 18, wherein the sheath comprises PLA, the core comprises at least one of polypropylene, polyethylene, or polyethylene terephthalate.

24. The process of claim 18, further comprising dissipating static charge from the PLA spunbond nonwoven fabric proximate to a calender via a static control unit.

25. The process of claim 24, wherein the static control unit comprises a second ionization unit.

26. The process of claim 25, wherein the second ionization unit comprises an ionization bar extending over at least one of the plurality of PLA continuous filaments or the PLA spunbond nonwoven fabric in a cross direction.

* * * * *